UNITED STATES PATENT OFFICE.

HENRY MARANGOLO, OF NEW YORK, N. Y.

COMPOUND FOR TREATING GLASS.

SPECIFICATION forming part of Letters Patent No. 597,806, dated January 25, 1898.

Application filed July 31, 1897. Serial No. 646,703. (No specimens.)

*To all whom it may concern:*

Be it known that I, HENRY MARANGOLO, a subject of the King of Italy, residing in the city, county, and State of New York, have invented a new and useful Compound for the Treatment of Glass and the Like, of which the following is a specification.

The object of my invention is to provide a compound easily applicable to polished and vitreous surfaces, such as glass and the like, which will render the glass more transparent, preserve its transparency, and prevent rupture of the glass, which may result from the formation of frost thereon, by preventing the frost from forming on the surface of the glass when exposed, as in windows and the like.

My invention consists of a fluid carrier, preferably glycerin, intimately mixed with alcohol (wood-alcohol may be used) and water to form a fluid mixture approximately in the proportions hereinafter given.

In practicing my invention I take a desired quantity of glycerin of commerce, in bulk, and add thereto water and alcohol, approximately in the proportions of about forty per cent. of glycerin, forty per cent. of alcohol, and twenty per cent. of water, and intimately commingle these ingredients in a mechanical mixer, preferably contained within a closed vessel. When the glycerin, alcohol, and water have become properly mixed or commingled, I pour the same into bottles or other like receptacles, and it is then ready for use.

To use my compound, it is only necessary to apply some of it with a clean sponge, brush, or cloth on the surface of the glass having the highest temperature—viz., in summer on the outside or exposed side of the glass and in the winter on the inner or non-exposed surface. Then thoroughly dry the glass by rubbing with a clean cloth or the like.

In summer ice can be used to reduce the temperature of the compound.

My compound will adhere to the surface of the glass, rendering it more transparent, will prevent the accumulation of frost and the like upon glass, thereby preventing rupture, and further improves the appearance of the glass and preserves its luster.

Having described my invention, I claim—

1. A new fluid compound, comprising alcohol, a fluid carrier for the alcohol, and water, intimately combined, substantially as herein set forth.

2. A new fluid compound, comprising alcohol, glycerin, and water, intimately combined, substantially as herein set forth.

3. A new fluid compound, composed of forty per cent. of alcohol, forty per cent. of glycerin and twenty per cent. of water intimately mixed together, substantially as described.

Signed at the city, county, and State of New York this 28th day of July, 1897.

HENRY MARANGOLO.

Witnesses:
 JOSEPH L. LEVY,
 WILLIAM JACOBS, Sr.